July 14, 1970  E. O. ACKER  3,520,220

SLITTING MACHINE

Filed Dec. 18, 1967

INVENTOR.
ERIC O. ACKER

BY
Dunlap and Laney
ATTORNEYS

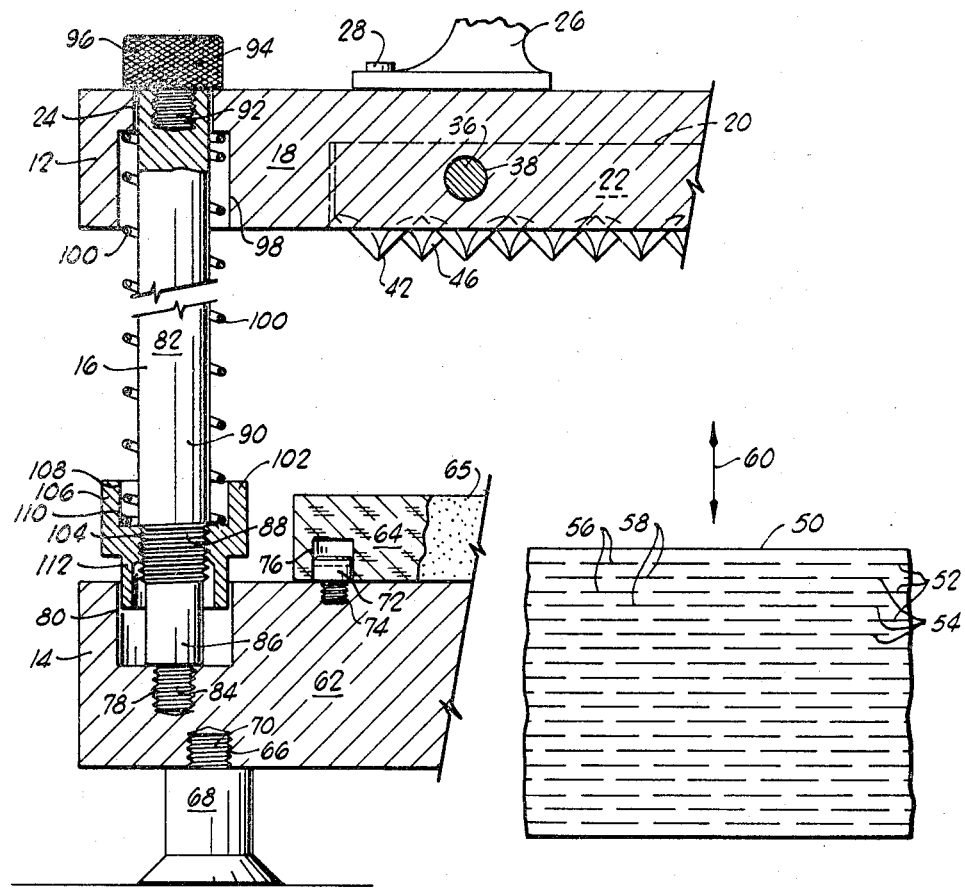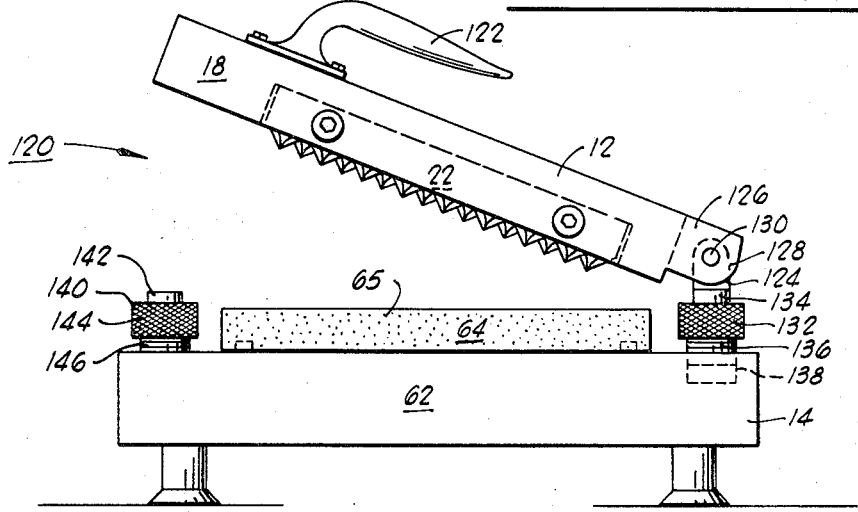

United States Patent Office 3,520,220
Patented July 14, 1970

3,520,220
SLITTING MACHINE
Eric O. Acker, 4436 NW. 59th St.,
Oklahoma City, Okla. 73112
Continuation-in-part of application Ser. No. 518,140,
Jan. 3, 1966. This application Dec. 18, 1967, Ser.
No. 691,559
Int. Cl. B26d 5/10; B26f 1/18
U.S. Cl. 83—529                           7 Claims

ABSTRACT OF THE DISCLOSURE

Apparatus for slitting thin material, particularly skin in preparation for skin-grafting operations, the apparatus consisting of a base member formed of resilient material and having a smooth surface for receiving the thin material, and then a slitting component carrying a plurality of rows of cutting teeth and being movably affixed to said base member such that it can be brought into contact therewith to place plural rows of slits in the thin material.

REFERENCE TO RELATED APPLICATION

This application constitutes a continuation-in-part of co-pending U.S. application, Ser. No. 518,140 entitled "Slitting Machine," filed on Jan. 3, 1966 in the name of the present inventor, Eric O. Acker.

BACKGROUND OF THE INVENTION

Field of the invention

The invention relates generally to improved apparatus for slitting relatively thin material and, more particularly but not by way of limitation, it relates to an improved apparatus for forming a plurality of rows of slits in thin sheets of skin for use in performing various forms of skin surgery.

DESCRIPTION OF THE PRIOR ART

While the prior art includes very many forms of cutting and slitting machines, these being for various specific uses, having different weights and precision capabilities, and generally running the gamut of mechanical design, there is very little prior teaching as to skin or thin material slitting machines for expanding specimens of skin for grafting purposes. The surgical process and teachings necessitating a skin web are of relatively recent genesis among the medical specialists. In one form of machine which has been previously developed, the skin is placed between two layers of plastic or such material and then passed through rollers containing a plurality of rows of cutting knives. The skin and plastic moving through the machine is compressed as it is fed between the rolls and this tends to mutilate the skin and to force some of the vital liquids therefrom. The aforementioned co-pending patent application is generally directed toward a slitting machine which contacts the skin in only a pure shearing relationship such that the skin patch is damaged as little as possible, and due to this the eventual healing process is greatly improved.

SUMMARY OF THE INVENTION

The present invention contemplates a slitting machine which can be manually operated to place a precision slit pattern in an expanse of thin material. In a more limited aspect, the invention consists of a base member having a resilient surface and a slitting assembly affixed in movable relation thereto, the slitting assembly retaining a plurality of cutter bars therein in a disposition which is movable into slitting engagement with the surface of the base member. The slitting assembly may be movably affixed for either linear or pivotal movement into engagement with the base member and, in either case, it is supportably affixed to the base member through adjustable connections which enable variation in the size and array of the slit pattern.

Therefore, it is an object of the present invention to provide a slitting machine which is much improved as to its capability to place a predetermined slit pattern in thin material cleanly and with reliable precision.

It is another object of the present invention to provide a machine for forming mesh skin patterns of preselected size for use in skin-graft surgery equivalent to the pinch grafting process which enables improved healing with less danger of infection.

It is a further object of the present invention to provide an improved skin slitting machine which will remain in precise alignment through repeated usage with a much diminished danger of dulling or misaligning the cutting implements through such usage.

Finally, it is an object of the present invention to provide a thin material slitting machine which is easily adjustable both as to mesh-size and strand size individually.

Other objects and advantages of the invention will be evident from the following detailed description when read in conjunction with the accompanying drawings which illustrate the invention.

BRIEF DESCRIPTION OF THE DRAWINGS

FIG. 4 illustrates an expanse of thin material having a mesh-forming slit pattern cut therein;

FIG. 5 is a partial section along lines 5—5 of FIG. 1;

FIG. 6 is an elevation of an alternative form of the invention.

DESCRIPTION OF A FIRST EMBODIMENT

Figure 1:
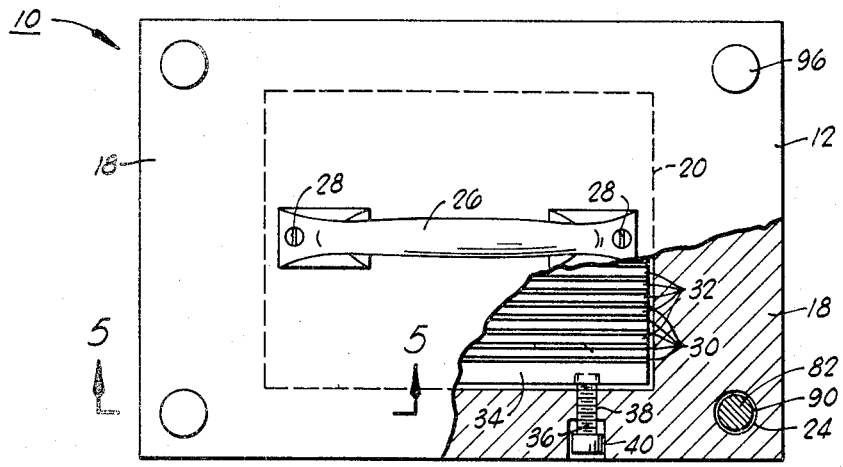
FIG. 1 is a top view in partial cutaway of one embodiment of the invention.
Figure 2:
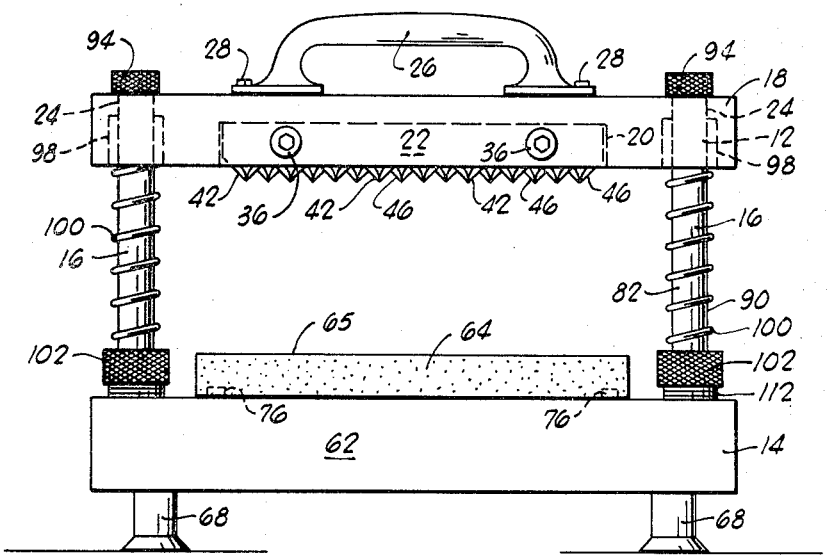
FIG. 2 is an elevation of the device shown in FIG. 1.

A slitting machine 10, shown in FIGS. 1 and 2, consists of an upper slitting assembly 12 supported over a base member 14 by means of a plurality of supporting guides 16. The slitting assembly 12 consists of a block 18 which is preferably formed of a hard metal suitable for construction of precision equipment, e.g. stainless steel. The block 18 is formed with a rectangular recess portion 20 formed in its underside for the purpose of receiving a cutting assembly 22 therein, and vertically aligned holes 24 are disposed in each corner of block 18 for the purpose of receiving support guides 16 slidably therethrough. A manipulation handle 26 is centrally secured to the upper surface of block 18 by suitable means such as screws 28 or other conventional fasteners.

Figure 3A:
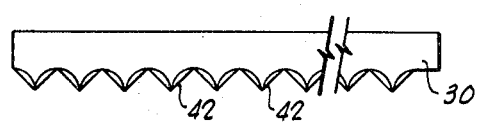
FIGS. 3A and 3B illustrate a cutter bar and cutter bar spacer, respectively.
Figure 3B:
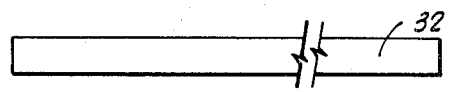

The cutting assembly 22 consists of a plurality of cutter bars 30 and spacer bars 32, as shown in FIGS. 3A and 3B. The plurality of such cutter bars 30 and spacer bars 32 are arranged in alternating order and retained together within recess 20 by means of a clamping bar 34 (See FIG. 1) having clamping bar screws 36 rotatably engaged therein. The clamping bar screws 36 are threadedly engaged through a threaded hole 38 and counterbore 40. Thus, clamping bar screws 36 can be manipulated to move clamping bar 34 laterally thereby to secure and release the various arrangements of cutting assemblies 22 which may be placed therein.

Alternate ones of the cutter bars 30 (FIG. 3A) are arranged with displaced alignment of cutting teeth to enable an alternating off-set cutting effect as is well-known in the art of expanding sheet material. Thus, and referring also to FIG. 2, cutting assembly 22 may consist of a cutter bar 30 having a plurality of sequentially and equally spaced cutter teeth 42 therealong, next a spacer bar 32 of predetermined width is inserted, thereafter a cutter bar 30 having similar but diagonally offset cutter teeth 44 projecting therefrom, and then another spacer bar 32, and so on until the required width of cutting assembly 22 is filled out.

FIG. 4 shows a section of skin or other such thin material 50 after it has been slit by slitting machine 10. The slit pattern is made up of alternating rows 52 and 54 which are diagonally offset with respect to one another. That is, all individual slits 56 of rows 52 line up in a straight column while all individual slits 58 of rows 54 also line up in a straight column; however, columns of slits 58 are always diagonally offset by approximately one-half of a slit length from the columns of slits 56. This is in keeping with standard sheet materials expansion practice such that stretching tension in the direction of arrow 60 will alter the thin material 50 into a mesh pattern covering considerably greater expanse. As previously noted, the mesh diamond size as well as strand size may be varied by selection of the widths of cutter bars 30 and spacer bars 32.

The base member 14 consists of a base block 62, preferably formed from a heavy, rigid metal such as stainless steel. A cutting pad or base plate 64 having a cutting surface 65 is rigidly held on top of base block 62 and this cutting pad may be formed from a compressible material such as cork so that it will provide a shearing resistance against each of the individual cutter teeth 42 and 44. The cutting surface 65 is shown and described as a flat surface but some machine designs may require a curved, arcuate cutting surface.

FIG. 5 shows one form of construction of the base member 14. Thus, base block 62 may have threaded holes 66 formed in each corner to receive a footing member 68 having threaded securing extension 70 integrally formed therewith. In like manner, the base plate 64 may be removably held atop base block 62 by means of plural, spaced positioning screws 72. The positioning screws 72 may be secured within a plurality of threaded holes 74 placed at spaced intervals, e.g. in quadrature, so that each may be received upward within a respective hole 76 formed in the underside of the base plate 64. There are various alternative construction features which may be employed.

FIG. 5 also shows the support guide 16 in the manner whereby it is movably supported vertically from the base member 14. Each corner of base block 62 is formed with a vertically-aligned threaded hole 78 having a relatively large counterbore portion 80. A vertical guide pin 82 is then rigidly secured within each of said threaded holes 78 by means of a threaded end portion 84. The guide pin 82 extends upward as a first cylindrical portion 86 which extends into a threaded portion 88 and this, in turn, joins an upper cylindrical portion 90. The top end of cylindrical portion 90 is formed with an axial, threaded hole 92 which receives a knurled-head retaining bolt 94 therein. The knurled-head 96 of retaining bolt 94 is slightly larger in diameter than the respective hole 24 through upper plate 18, this tending to hold the slitting machine 10 intact as will be further described below.

The underside of holes 24 through upper plate 18 are formed with an enlarged counterbore 98 and this provides a seating for the upper end of a compression spring 100. The compression spring 100 extends downward along upper cylindrical portion 90 of guide pin 16 whereupon a lower seating is provided by a thread assembly 102 having a threaded axial bore 104 which mates with threaded portion 88 of guide pin 16. Thread assembly 102 consists of an upper collar portion 106 which defines a counterbore 108 and an annular shoulder 110 to provide seating for the lower end of spring 100. The lower end of thread assembly 102 is formed as a lower collar portion 112 which extends freely downward within the counterbore 80 in base block 62.

Adjustment of thread assembly 102 varies the limit of the downward traverse of the slitting assembly 12 to vary the slitting relationship between cutting teeth 42 and 44 and the upper surface 65 of base plate 64. The outer surface of lower collars 112 (thread assemblies 102) may each be calibrated in the manner of a micrometer to provide fine adjustment of the limits for each support guide 16.

OPERATION

The skin or other such thin material which is to be slit for mesh expansion is first placed on the upper surface 65 of base plate 64 in the proper cutting area as suitably marked off or scored thereon. The handle 26 is employed to effect downward manipulation of slitting assembly 12 against the compression of each of the springs 100 along guide posts 16. The respective rows of cutter teeth 42 and 44 are then forced through the thin material in slitting engagement and, thereafter, slitting assembly 12 can be released for return to its upward attitude. The slit material may then be removed and stressed in such manner as to expand it into its mesh pattern.

The length of the slits may be varied by the micrometer adjustment of thread assembly 102. Adjustment of thread assembly 102 varies the limit of downward traverse of slitting assembly 12 as the lower facing of upper plate 18, those portions surrounding counter bores 98, abut against the top, annular surface of thread assembly 102, i.e. the top of upper collar portion 106. It can readily be seen that variation of the level of the stop or top of upper collar 106 will vary the depth of penetration of the cutting teeth 42 and 44, this tending to vary the respective length of their cuts which, in turn, varies the connecting portions between linear cuts and therefore the size of the mesh diamond of the material when expanded.

The slitting machine 10 operates with precision such that an initial slitting stroke of slitting assembly 12 can be made in a thin material and then, after determination of the suitability of the slit pattern and changes of each of thread assemblies 102 accordingly, the slitting assembly 12 can be moved downward again to enlarge the individual slits of the pattern. Several strokes can be made in this manner until the desired split pattern is obtained.

Still further adjustment of the slit pattern is made by selection of the width of the cutter bars 30 and/or the spacer bar 32. Any manner of assembly of the cutter bars 30 and spacer bars 32 may be employed to effect whatever slitting pattern desired. Variation of the width of spacer bar 32 is a direct alteration of the strand size in the finished, expanded thin material. In still other cases it may be desirable to change the shearing pitch of the cutting teeth 42 and/or 44 as well as the thickness or length of the cutter bars 30.

It should be understood that in the handling of skin, especially very fine thicknesses of skin, it is desirable to employ certain medical materials to aid in the slitting operation. Thus, it is often found desirable to place the skin specimen on an adhesive plastic vehicle, probably a water soluble plastic carrier of well-known type, whereupon the skin as carried by the plastic material can be slit by slitting machine 10 with minimal crushing of the skin tissue and without the tendency for the skin to move upward in disfiguring adherence to the cutter teeth 42 and 44.

AN ALTERNATIVE EMBODIMENT

FIG. 6 illustrates an alternative form of the invention wherein a slitting machine 120 is formed as a slitting assembly 12 having a pivoting handle 122 and being movably secured by a pivotal guide post 124 to the base member 14. The slitting assembly 12 and base member 14 are similar in all respects except that the manner of inner-connection is changed to give a pivotal rather than a parallel compression movement in the cutting operation.

In this alternative, one side of the upper plate 18 is formed with a pair of extending pivot tabs 126. Each of the tabs 126 is then led into pivotal engagement with a post 128 as secured by a pivot pin or button 130 enabling rotary movement. Each of posts 128 are then extended downward into secure engagement with a knurled-head thread assembly 132 which is secured in the base block 62. In order to maintain the adjustability features, it is desirable to construct the guide posts 124 so that knurled-head thread assembly 132 can be rotated to raise and lower the pivot point or axis of button 130. This may be effected in various well-known ways, one way being to provide a rotary flange connection between the knurled-head thread assembly 132 and the base 134 of post 128 so that a lower threaded portion 136 can be screwed into or out of a tapped bore 138 within the base box 62 to provide vertical positioning.

A similar adjustable arrangement can be employed for a pair of adjustable limit stops 140 disposed on the opposite side of base member 14. Thus, an upper stop post 142 is employed as a limit stop to abut against the lower surface of upper plate 18. The stop post 142 can then be rotatably secured as by flanged insertion within knurled-head portion 144 which, in turn, extends a threaded lower portion 146 into or out of a receiving threaded cavity (not shown) similar to the threaded bore 138.

The operation of the device of FIG. 6 effects slitting of thin material in the same manner as the previously described embodiment. The only difference is that the operator employs a pivotal movement of slitting assembly 12 rather than a straight-down pressing movement. The effect as to the slitting seems to be about the same, the precision of the operation depending upon concise design and fitting of the structure making up the guide supports 124. The various features as to adjustability are not changed.

The foregoing discloses novel slitting apparatus which places predetermined slit pattern in a sheet of thin material, the slitting contact being essentially totally a shearing one. This form of slitting function is particularly desirable in preparing skin for use in skin-mesh grafting surgery as the cells of the skin are only slightly damaged adjacent sheared points with the majority of the expanse being preserved in good cell structure with all vital juices intact. The machine is particularly attractive in its capability to maintain precision cutting alignment, as for example when alternating cuts and stop adjustments are made to enable a slit pattern of exactly the right configuration.

Changes may be made in the combination and arrangements of elements as heretofore set forth in the specification and shown in the drawings; it being understood that changes may be made in the embodiments disclosed without parting from the spirit and scope of the invention as defined in the following claims.

What is claimed is:
1. Apparatus for forming a plurality of rows of short slits in a relatively thin material, said apparatus comprising:
   a base member having a smooth surface for supporting said material to be slit;
   a slitting assembly movably positioned on said base member, said slitting assembly including,
      carrier means,
      cutting means mounted on said carrier means and including plural rows of a plurality of toothed cutter members disposed generally toward said base member; and
   guide means connecting said base member and said slitting assembly which includes, plural guide posts secured on said base member in spaced relation and extending in slidable relationship through said slitting assembly, and
   limit means affixed to each of said guide posts to limit the travel of the slitting assembly toward the base member.

2. Apparatus as set forth in claim 1 wherein said limit means comprises:
   plural compression springs, each disposed around one of said guide posts, for continually urging said slitting assembly away from said base member; and
   stop means disposed about each of said guide posts between the compression spring and base member to limit the travel of said cutting means toward said base member.

3. Apparatus as set forth in claim 2 which is further characterized in that:
   said stop means are adjustable to vary said limits such that they effect a variation in the slit pattern which is cut in said thin material.

4. Apparatus as set forth in claim 1 wherein said cutting means comprises:
   a plurality of cutter bar means each extending a plurality of cutting teeth therefrom; and
   a plurality of spacer bar means disposed between each adjacent pair of said cutter bar means in said slitting assembly.

5. Apparatus as set forth in claim 1 wherein said cutting means comprises:
   a plurality of first cutter bar means each extending plural cutter teeth in equal spaced linear array;
   second cutter bar means each extending a plurality of cutter teeth of equal spaced linear array which is diagonally offset from the linear array of said first cutter bar means, each of said second cutter bar means being disposed in parallel between two of said first cutter bar means; and
   a plurality of spacer bar means disposed in between each adjacent pair of said first and second cutter bar means.

6. Apparatus as set forth in claim 4 wherein said carrier means comprises:
   a block member of generally rectangular configuration having a rectangular recess in the bottom side and receiving said cutter bar means and spacer bar means upward therein; and
   clamp means for rigidly holding said cutter bar means and spacer bar means within said recess to extend the cutter teeth below said bottom side of the block member.

7. Apparatus as set forth in claim 4 wherein said guide means comprises:
   plural guide posts secured on said base member in spaced relation and extending in slidable relationship through said slitting assembly; and
   limit means affixed to each of said guide posts to limit travel of the slitting assembly toward the base member.

References Cited
UNITED STATES PATENTS

| | | | |
|---|---|---|---|
| 92,600 | 7/1869 | Gaston | 83—695 X |
| 1,152,577 | 9/1915 | Von Bültzingslöwen. | |
| 1,164,240 | 12/1915 | Von Bültzingslöwen | 17—25 |
| 1,965,462 | 7/1934 | Irwin | 17—25 |
| 2,217,763 | 10/1940 | Moldawsky | 17—25 |
| 2,243,623 | 5/1941 | Ewald | 17—25 |
| 2,235,948 | 3/1941 | Schwisow | 83—620 X |

JAMES M. MEISTER, Primary Examiner

U.S. Cl. X.R.

83—599, 620, 660, 695, 588